(12) United States Patent
Thomas

(10) Patent No.: US 10,857,425 B2
(45) Date of Patent: Dec. 8, 2020

(54) RESISTANCE-BAND EXERCISE MONITORING DEVICE AND ASSOCIATED METHODS

(71) Applicant: Rodney Harold Thomas, St. Louis, MO (US)

(72) Inventor: Rodney Harold Thomas, St. Louis, MO (US)

(*) Notice: Subject to any disclaimer, the term of this patent is extended or adjusted under 35 U.S.C. 154(b) by 57 days.

(21) Appl. No.: 16/287,717

(22) Filed: Feb. 27, 2019

(65) Prior Publication Data

US 2019/0269967 A1  Sep. 5, 2019

Related U.S. Application Data

(60) Provisional application No. 62/638,636, filed on Mar. 5, 2018.

(51) Int. Cl.
*A63B 24/00* (2006.01)
*A63B 21/00* (2006.01)
(Continued)

(52) U.S. Cl.
CPC .... *A63B 24/0062* (2013.01); *A63B 21/00061* (2013.01); *A63B 21/0555* (2013.01);
(Continued)

(58) Field of Classification Search
CPC .......... A63B 24/0062; A63B 21/00061; A63B 21/0555; A63B 21/4035; A63B 21/4043; A63B 2220/833; A63B 2220/51; A63B 2225/50; A63B 2225/09; A63B 2220/807; A63B 21/00; A63B 21/02–022; A63B 21/04–0442; A63B 21/055–0557; A63B 5/20; G01L 5/101; G01L 5/047
See application file for complete search history.

(56) References Cited

U.S. PATENT DOCUMENTS 5,271,416 A  12/1993  Lepley
7,743,656 B1  6/2010  Dickinson et al.
(Continued)

OTHER PUBLICATIONS

Data sheet for StretchSense™ Silicone Stretch Sensor (Version 4.0 171016), Copyright 2012-2017, 5 pp.
(Continued)

*Primary Examiner* — Andrew S Lo
(74) *Attorney, Agent, or Firm* — Lathrop GPM LLP

(57) ABSTRACT

A resistance-band exercise monitoring device includes a first force sensor that senses a first force applied to a first resistance band, a second force sensor that senses a second force applied to a second resistance band, a single electronics module with a single transceiver for wirelessly communicating with a remote device, and a flexible strap physically coupling with the first and second resistance bands. The flexible strap has conductive pathways electrically coupling the force sensors to the single electronics module. The single electronics module communicates values indicative of the first and second forces to the remote device via the single transceiver. The flexible strap does not stretch and protects the conductive pathways from excessive stress. The resistance-band exercise monitoring device may be configured in multiple ways to perform a wide variety of exercises.

15 Claims, 10 Drawing Sheets

(51) Int. Cl.
*A63B 21/055* (2006.01)
*G01L 5/101* (2020.01)

(52) U.S. Cl.
CPC ...... *A63B 21/4035* (2015.10); *A63B 21/4043* (2015.10); *G01L 5/101* (2013.01); *A63B 2220/51* (2013.01); *A63B 2220/807* (2013.01); *A63B 2220/833* (2013.01); *A63B 2225/09* (2013.01); *A63B 2225/50* (2013.01)

(56) References Cited

U.S. PATENT DOCUMENTS

| | | | | |
|---|---|---|---|---|
| 7,785,243 | B2* | 8/2010 | Kassel | A63B 21/0442 482/122 |
| 8,287,434 | B2 | 10/2012 | Zavadsky et al. | |
| 8,491,446 | B2 | 7/2013 | Hinds et al. | |
| 8,657,727 | B1* | 2/2014 | Kassel | A63B 21/4001 482/122 |
| 9,050,484 | B2 | 6/2015 | Flentye et al. | |
| 9,135,347 | B2 | 9/2015 | Damman et al. | |
| 9,446,288 | B1 | 9/2016 | Pazan | |
| 2004/0180767 | A1* | 9/2004 | Carmel | A63B 21/4025 482/126 |
| 2005/0130812 | A1* | 6/2005 | DiOrio | A63B 21/0023 482/91 |
| 2008/0119763 | A1 | 5/2008 | Wiener | |
| 2008/0242509 | A1 | 10/2008 | Menektchiev et al. | |
| 2011/0230314 | A1* | 9/2011 | Hoffman | A63B 24/0062 482/51 |
| 2012/0245002 | A1* | 9/2012 | Todd | A63B 21/4013 482/124 |
| 2015/0004581 | A1 | 1/2015 | Selman et al. | |
| 2016/0114211 | A1 | 4/2016 | Schmidt | |
| 2018/0056104 | A1* | 3/2018 | Cromie | A61H 3/00 |
| 2018/0236295 | A1* | 8/2018 | Oltorik | A63B 21/0442 |
| 2019/0054338 | A1* | 2/2019 | Tang | A63B 21/068 |
| 2019/0175974 | A1* | 6/2019 | Matthews | A63B 21/4035 |
| 2019/0175975 | A1* | 6/2019 | Carriere | A63B 21/00178 |
| 2019/0344123 | A1* | 11/2019 | Rubin | A63B 21/0054 |
| 2020/0023229 | A1* | 1/2020 | Oltorik | A63B 1/00 |

OTHER PUBLICATIONS

Fitify. "LiftUp: Smart Resistance Band with Sensors & App" Updated on May 28, 2017. Available at http://www.fitnessgizmos.com/liftup/, 2 pp.

* cited by examiner

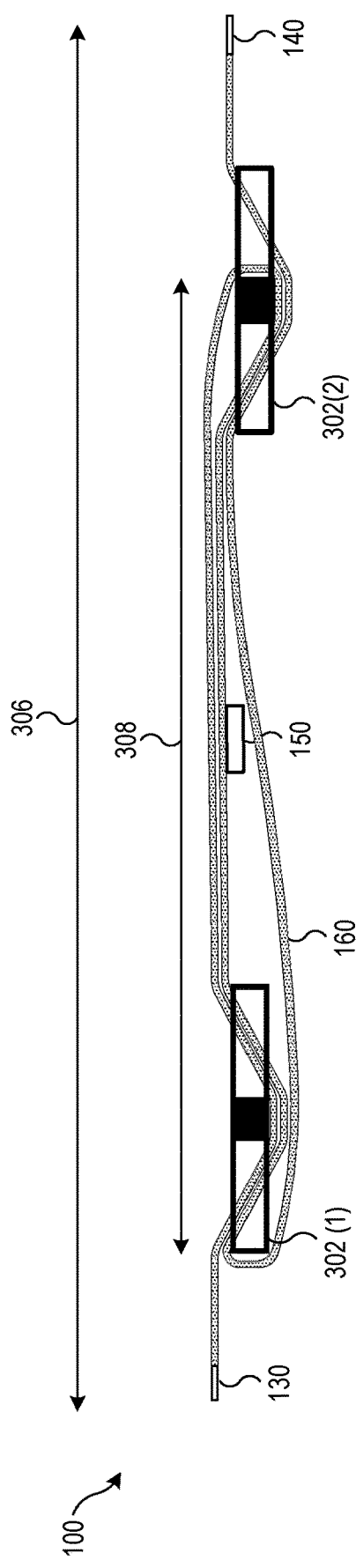

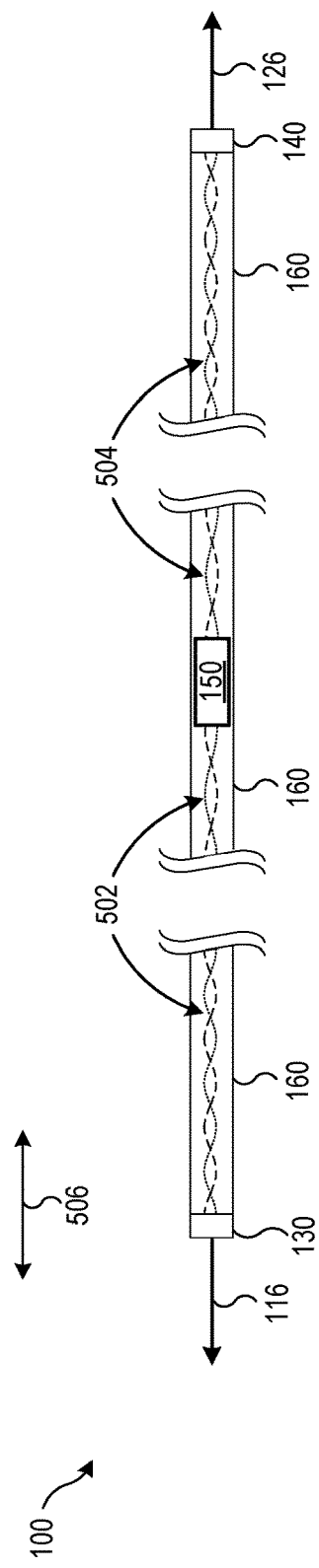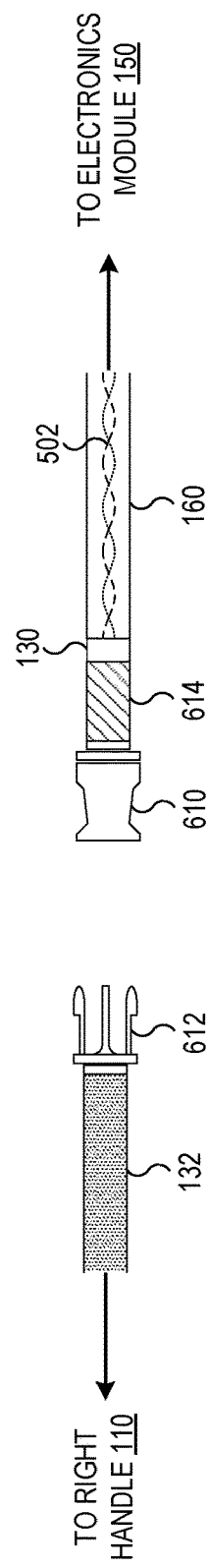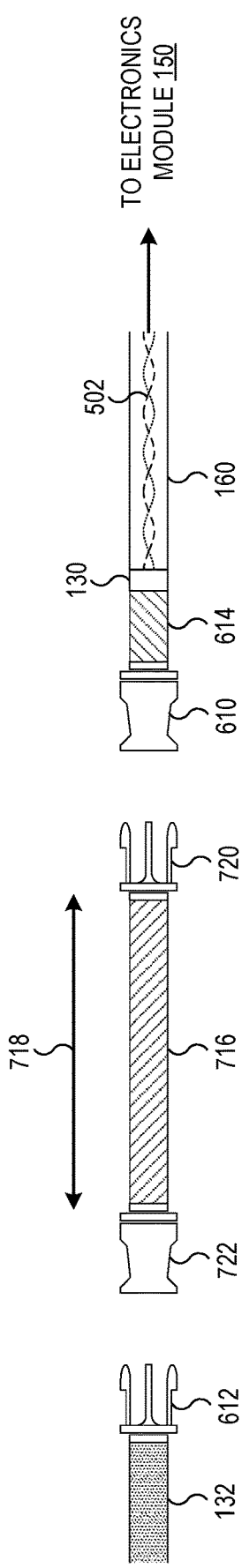
FIG. 5
FIG. 6
FIG. 7

RESISTANCE-BAND EXERCISE MONITORING DEVICE AND ASSOCIATED METHODS

RELATED APPLICATIONS

This application claims priority to U.S. Provisional Patent Application No. 62/638,636, filed Mar. 5, 2018, which is incorporated herein by reference.

BACKGROUND

Resistance bands are one type of exercise device that may utilize force sensors to electronically monitor exercise. Force sensors may be integrated into, or placed adjacent to, handles coupling with resistance bands.

SUMMARY OF THE EMBODIMENTS

In one embodiment, a resistance-band exercise monitoring device includes a first force sensor mechanically coupled with a first resistance band to sense a first force applied to the first resistance band, and a second force sensor mechanically coupled with a second resistance band to sense a second force applied to the second resistance band. The device also includes a single electronics module having a single wireless transceiver, and a flexible strap physically coupling with the first and second resistance bands at opposite ends of the flexible strap. The flexible strap has conductive pathways that electrically couple each of the first and second force sensors with the single electronics module. The single electronics module is configured to wirelessly communicate exercise data indicative of the first and second forces to a remote device via the single wireless transceiver.

In another embodiment, a method that electronically monitors resistance-band exercise includes receiving, in a single electronics module via a first set of conductor pathways of a flexible strap, a first sensor signal from a first force sensor mechanically coupled with a first resistance band. The first resistance band is physically coupled with a first end of the flexible strap. The method also includes receiving, in the single electronics module via a second set of conductor pathways of the flexible strap, a second sensor signal from a second force sensor mechanically coupled with a second resistance band. The second resistance band is physically coupled with a second end, opposite the first end, of the flexible strap. The method also includes processing the first and second sensor signals within the single electronics module to generate exercise data indicative of the resistance-band exercise performed with the first and second resistance bands. The method also includes transmitting the exercise data to a remote device via a single wireless transceiver of the single electronics module.

In another embodiment, a remote device for receiving exercise data from a resistance-band exercise monitoring device includes a processor, a wireless transceiver, a display, and a memory communicatively coupled with the processor, the wireless transceiver, and the display. The remote device also includes an application, implemented as machine-readable instructions stored in the memory, that, when executed by the processor, controls the remote device to receive, via the wireless transceiver, conditioned data transmitted by a single wireless transceiver of a single electronic module of the resistance-band exercise monitoring device. The conditioned data indicates first and second forces applied to respective first and second resistance bands, and the first and second forces are sensed with respective first and second force sensors mechanically coupled with the respective first and second resistance bands. The first and second force sensors are electrically coupled with the single electronics module via electrical conductors of a flexible strap of the resistance-band exercise monitoring device. The application also controls the remote device to transform the conditioned data into exercise data according to a mathematical transformation, and to display the exercise data on the display.

BRIEF DESCRIPTION OF THE DRAWINGS

FIG. 3 is a side view showing one example adjustment mechanism for adjusting a length of the resistance-band exercise monitoring device of FIGS. 1-2, in embodiments.

FIG. 4 is a top view of the example adjustment mechanism of FIG. 3.

FIG. 5 is a functional diagram showing electrical connectivity between force sensors and an electronics module of the resistance-band exercise monitoring device of FIGS. 1-4, in embodiments.

FIG. 6 is a functional diagram showing one example coupling mechanism for physically coupling the resistance-band exercise monitoring device of FIGS. 1-5 to a resistance band, in embodiments.

FIG. 7 is a functional diagram showing the resistance-band exercise monitoring device of FIGS. 1-5 configured with an extension strap, in embodiments.

DETAILED DESCRIPTION OF THE EMBODIMENTS

Resistance-band exercise devices are popular because they are convenient (e.g., lightweight and easily transported) and may be used for a wide variety of isotonic exercises. Part of the versatility of a resistance-band exercise device is that anchor points may be created on or along the resistance band, allowing a user to perform two independent exercises, one with each handle. A user may benefit from the use of anchor points by exercising two limbs (e.g., both arms) singularly, simultaneously, or in an alternating sequence.

Resistance-band exercise devices benefit from the inclusion of force sensors that allow users to monitor performance and track progress by electronically recording, storing, retrieving, and analyzing exercise data. When a user performs two independent exercises by establishing an anchor point on or along the resistance band, two force sensors may be used to measure each of the two independent exercises.

One aspect of the present embodiments is the realization that two force sensors used with a resistance-band exercise device may be placed close to each other, so that they may advantageously share a single microprocessor, wireless transceiver, and battery. This reduction in component count reduces cost and improves reliability. A second aspect of the embodiments is the realization that the force sensors may be placed away from the handles, which advantageously minimizes the length of wire needed to electrically connect the two sensor outputs with the microprocessor. When a user stretches a resistance band, the force applied by the user establishes a tension within the resistance band that is constant along the length of the resistance band. As a result, the force applied by the user may be determined from a measurement of the tension at any point along the resistance band.

It is known in the prior art that a single force sensor and wireless transceiver may be incorporated within a handle connected to a resistance band, or placed between the handle and the resistance band. However, this arrangement disadvantageously requires two wireless transceivers, two microprocessors, and two batteries (e.g., one for each handle). This unnecessary doubling of components increases cost, size, and weight and reduces reliability. In addition, the need to independently recharge or replace two separate batteries is inconvenient.

Figure 1:
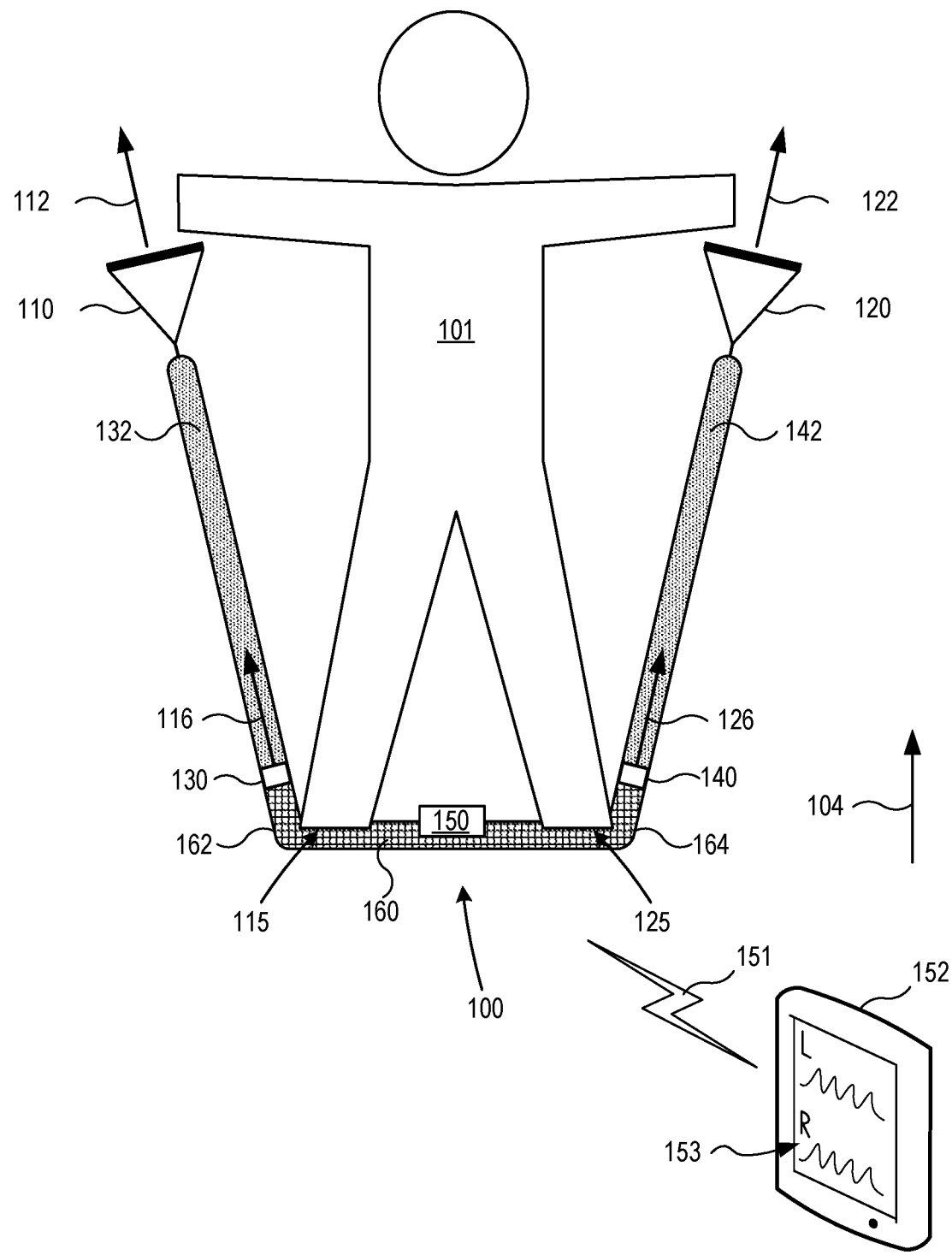
FIG. 1 is a functional diagram showing one example resistance-band exercise monitoring device being used to monitor a first resistance-band exercise, in embodiments.

FIG. 1 is a functional diagram showing one example resistance-band exercise monitoring device 100 being used to monitor a first resistance-band exercise. Resistance-band exercise monitoring device 100 has an electronics module 150 and a flexible strap 160 attached to a right force sensor 130 and a left force sensor 140. In the example of FIG. 1, right force sensor 130 physically couples to a right resistance band 132, and left force sensor 140 physically couples to a left resistance band 142. To facilitate exercise by a user 101, the ends of the left and right resistance bands 142, 132, opposite to left and right force sensors 140, 130, may attach to left and right handles 120, 110, respectively.

In the example of FIG. 1, user 101 exercises by standing on flexible strap 160, applying a right exertion force 112 to right handle 110 in a vertical direction 104, and applying a left exertion force 122 to left handle 120 in vertical direction 104. Right exertion force 112 stretches right resistance band 132 and establishes along right resistance band 132 a right tension 116 which is sensed by right force sensor 130. Similarly, left exertion force 122 stretches left resistance band 142 and establishes along left resistance band 142 a left tension 126 which is sensed by left force sensor 140.

Figure 9:
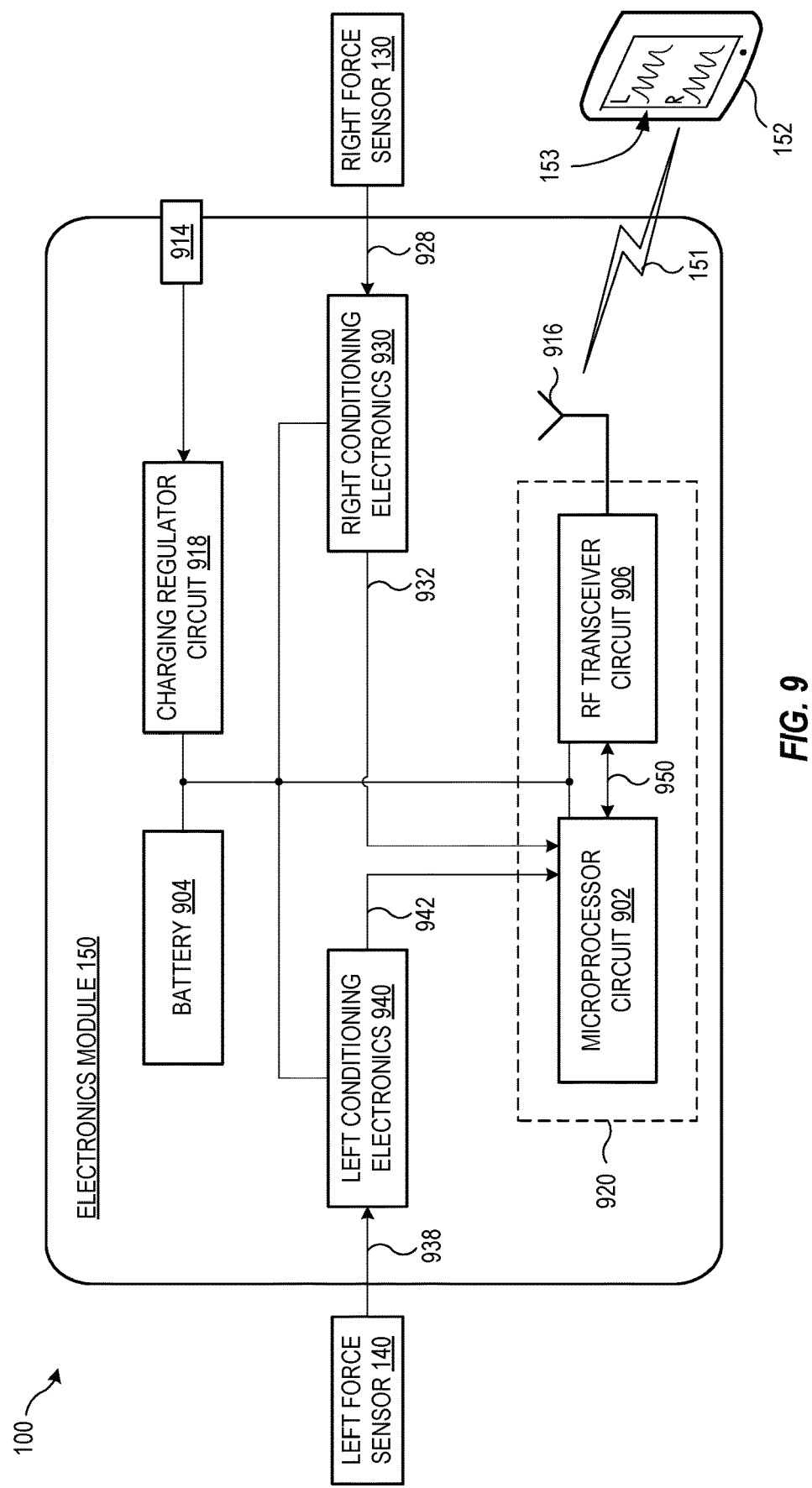
FIG. 9 is a schematic diagram showing example components and functionality of the electronics module of FIGS. 1-5 and 8, in embodiments.

Right force sensor 130 generates a first electrical signal indicative of the sensed right tension 116 that is received by electronics module 150 (see right sensor signal 928 in FIG. 9), and left force sensor 140 generates a second electrical signal indicative of the sensed left tension 126 that is received by electronics module 150 (see left sensor signal 938 in FIG. 9). Electronics module 150 processes the first and second electrical signals to determine first and second force values and wirelessly transmits a wireless communication 151 indicative of sensed tensions 116 and 126 to a remote device 152.

Remote device 152 is a computing and display device that includes a wireless transceiver, such as a desktop computer, laptop computer, tablet, or smartphone. Remote device 152 may process sensed tensions 116 and 126 and display processed sensed tensions 116 and 126 on a display 153 to a user (e.g., user 101, a coach, or a trainer). For example, oscillations in the data could be used to determine the number of repetitions performed over a specified time interval, the maximum force exerted at the peak of an oscillation, and the rate at which repetitions occur. In certain embodiments, the force data is combined with other parameters to calculate quantities of interest, such as the work performed and the instantaneous power exerted by the user.

When user 101 stands on flexible strap 160, a right anchor point 115 and a left anchor point 125 are created to serve as mechanical grounds, or references, that isolate right tension 116 from left tension 126. For certain exercises, user 101 may create a single anchor point by standing on flexible strap 160 using one foot with similar operation. When using resistance-band exercise monitoring device 100 with at least one anchor point along flexible strap 160, resistance bands 132, 142 may be used independently.

Figure 2:
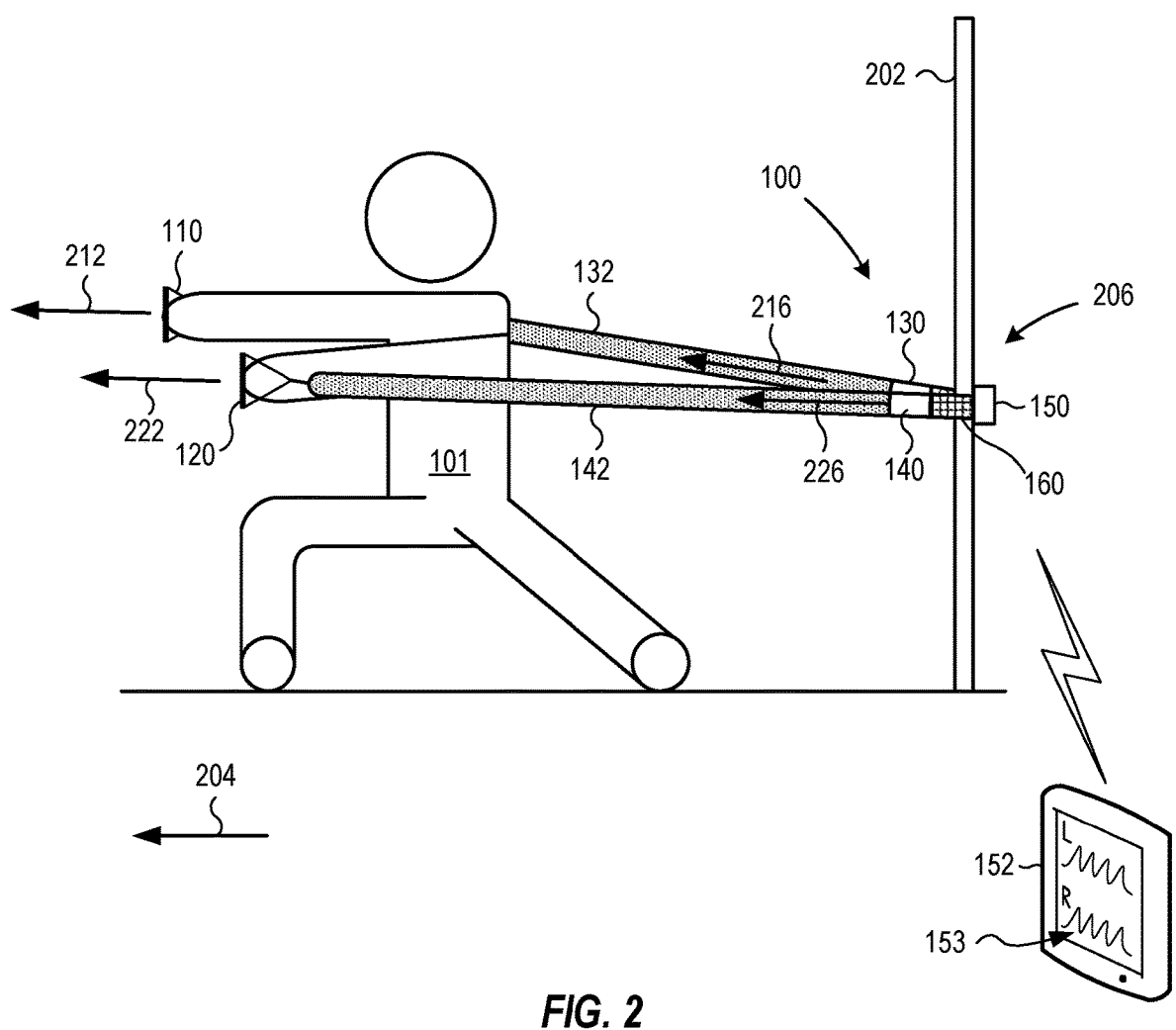
FIG. 2 shows the resistance-band exercise monitoring device of FIG. 1 being used to monitor a second resistance-band exercise.

FIG. 2 shows resistance-band exercise monitoring device 100 of FIG. 1 being used to monitor a second resistance-band exercise. For this exercise, flexible strap 160 is attached to, or wrapped around, a vertical support 202, such as a pole, door frame, door hinge, hook, or other mechanical body that provides rigid support to flexible strap 160. Vertical support 202 establishes an anchor point 206 that isolates the mechanics of right resistance band 132 from the mechanics of left resistance band 142.

While exercising, user 101 applies a left exertion force 222 to left handle 120 in a horizontal direction 204 away from vertical support 202, stretching left resistance band 142 and establishing along left resistance band 142 a left tension 226 sensed by left force sensor 140. Similarly, user 101 applies a right exertion force 212 to right handle 110 in horizontal direction 204 away from vertical support 202, stretching right resistance band 132 and establishing along right resistance band 132 a right tension 216 sensed by right force sensor 130.

As shown in FIGS. 1 and 2, flexible strap 160 is deformable, and therefore conforms to the shape of any mechanical support (e.g., the foot of user 101, vertical support 202) against which it is anchored to allow force sensors 130 and 140 to orient, independent of anchor points 115, 125, 206, in any direction required by tensions 116, 216 and 126, 226, respectively. Thus, flexible strap 160 allows right tension 116, 216 to align a measurement axis of right force sensor 130 with a direction of right tension 116, 216 (as indicated in FIGS. 1 and 2 by the direction of the arrow representing right tension 116, 216), and allows left tension 126, 226 to align a measurement axis of left force sensor 140 with a direction of left tension 126, 226 (as indicated in FIGS. 1 and 2 by the direction of the arrow representing left tension 126, 226). Since flexible strap is deformable, the direction of right tension 116, 216 is the same as the direction of right exertion force 112, 212, and the direction of left tension 126, 226 is the same as the direction of left exertion force 122, 222. In the example of FIG. 1, flexible strap 160 bends around each foot of user 101, and in the example of FIG. 2, flexible strap 160 bends around vertical support 202. Where flexible strap 160 is secured by other constraints, flexible strap 160 similarly conforms to that constraint such that force sensors 130 and 140 correctly align with respective tensions 116, 216 and 126, 226.

Flexible strap 160 has sufficient length (e.g., a distance between right force sensor 130 and left force sensor 140) to ensure that ends 162, 164 freely align with respective tensions 116, 216 and 126, 226 without physical interference to force sensors 130, 140. In the example of FIG. 1, length of flexible strap 160 may be as much as one meter to accommodate the stance of a tall adult. In the example of FIG. 2, where vertical support 202 is a pole with a five-centimeter diameter, flexible strap 160 may be shortened to have a length of 15 centimeters.

FIG. 3 is a side view showing one example adjustment mechanism for adjusting a length 306 (e.g., a distance between ends 162 and 164 and/or between force sensors 130 and 140) of resistance-band exercise monitoring device 100 of FIGS. 1-2. FIG. 4 is a top view of the example adjustment mechanism of FIG. 3. FIGS. 3 and 4 are best viewed together with the following description.

Flexible strap 160 may pass through and fold over adjuster buckles 302(1), 302(2) to form three overlapping layers of flexible strap 160 between adjuster buckles 302(1), 302(2), as shown. By varying the position of adjuster buckles 302(1) and 302(2) on flexible strap 160, length 306 may be increased or reduced. For example, as adjuster buckles 302(1) and 302(2) are moved toward force sensors 130 and 140, respectively, length 306 is reduced, and as adjuster buckles 302(1) and 302(2) are moved away from force sensors 130 and 140, respectively, length 306 is increased. Adjuster buckles 302(1) and 302(2) may be tri-glide buckles (as shown in FIGS. 3 and 4), flat slides, or any other type of adjuster that creates folds in flexible strap 160.

FIG. 5 is a functional diagram showing electrical connectivity between force sensors 130 and 140 and electronics module 150 of resistance-band exercise monitoring device 100 of FIGS. 1-4. Right electrical conductors 502 electrically couple right force sensor 130 with electronics module 150, and left electrical conductors 504 electrically couple left force sensor 140 with electronics module 150. In the example of FIG. 5, flexible strap 160 is shown straight for clarity of illustration. However, flexible strap 160 and electrical conductors 502 and 504 may flex or bend, such as when used for exercise (see FIGS. 1 and 2) and when folded for storage.

Advantageously, resistance-band exercise monitoring device 100 has, within electronics module 150, a single processor, a single wireless transceiver circuit, and a single battery, since force sensors 130, 140 are positioned at ends 162, 164 of flexible strap 160 and may be electrically coupled to electronics module 150. Accordingly, electronics module 150 has reduced cost and improved reliability as compared to other solutions that measure both tensions 116, 216 and 126, 226, with at least two processors and at least two transmitters. Furthermore, resistance-band exercise monitoring device 100 may receive power from a single source (e.g., battery) and thereby have simplified maintenance as compared to other solutions that utilize two or more batteries in separate processing/transmitting units.

Electrical conductors 502 and 504 may be configured within flexible strap 160 to protect electrical conductors 502 and 504 from physical damage. For example, electrical conductors 502 and 504 may be housed inside of flexible strap 160 or may be incorporated into the fabric or material of flexible strap 160. Flexible strap 160 does not stretch lengthwise, unlike resistance bands 132 and 142 (e.g., flexible strap 160 has a higher spring constant than resistance bands 132 and 142). Accordingly, tensions 116, 216 and 126, 226 induce minimal lengthwise extension of flexible strap 160 (e.g., along a length direction 506 as shown in FIG. 5), thereby minimizing stress to electrical conductors 502, 504.

In certain embodiments, flexible strap 160 is fabricated with electrical conductors 502, 504 passing through one or more layers of material conventionally used for gymnastics or cheerleading mats, such as one or more of polyethylene foam, cross-linked polyurethane foam, and/or carpet-bonded foam. In some of these embodiments, flexible strap 160 is covered with one or more layers of vinyl, polyester, or leather to protect the foam and electrical conductors 502, 504 therein. Electronics module 150 may be located underneath the cover or over the cover.

In certain embodiments, flexible strap 160 is fabricated from strapping or webbing made from nylon, polypropylene, polyester, cotton, or another type of woven fabric. In some of these embodiments, flexible strap 160 and electrical conductors 502, 504 may be combined as a textile and/or fabric, where electrical conductors 502, 504 are made from electrically-conductive fibers, threads and/or yarns, such as those used for "smart textiles" or "electronic textiles." For example, flexible strap 160 may be formed of a woven material such as one or more of cotton, Gore-Tex, and neoprene, that also includes electrically-conductive yarns that form electrical conductors 502 and 504 as a hybrid textile. These hybrid textiles may form a structural part of flexible strap 160, or may be included only to provide electrical pathways between force sensors 130, 140 and electronics module 150. In certain embodiments, flexible strap 160 is fabricated from rubber or plastic tubing, inside of which electrical conductors 502, 504 are placed.

Although electronics module 150 is shown in FIG. 2 as centered on strap 160, electronics module 150 may be alternatively positioned towards one end 162 or 164 of flexible strap 160, as may be advantageous when using resistance-band exercise monitoring device 100 with a single, central anchor point 206. In certain embodiments, electronics module 150 is a flexible electronic circuit positioned within and/or along flexible strap 160. Accordingly, electronics module 150 may flex similarly to flexible strap 160 to conform to vertical support 202, for example. Electronics module 150 may be included within additional housing for extra protection and/or may be positioned anywhere along flexible strap 160 without departing from the scope hereof.

In one embodiment, electronics module 150 is positioned towards one end 162 or 164 of flexible strap 160 to include a corresponding one of force sensors 130 or 140, respectively. Advantageously, only one set of electrical conductors is needed to connect the non-included sensor to electronics module 150.

Each of force sensors 130 and 140 is, for example, a load cell, strain gauge, force-sensing resistor, piezoelectric sensor, capacitive force sensor, inductive force sensor, and accelerometer. Force sensors 130 and 140 may be chip-based sensors, such as MEMS sensors. In certain embodiments, each of force sensors 130 and 140 is a chip-based sensor that digitally outputs the sensed force. Force sensors 130 and 140 may be vector force sensors that sense force in all directions. In one embodiment, each force sensor 130 and 140 is a silicone stretch sensor from StretchSense Ltd.

While electrical conductors 502 and 504 are shown in FIG. 5 as twisted-pair wires, the exact number, configuration, current capacity, and geometry of the wires may be selected based upon a type of force sensors 130 and 140. Electrical conductors 502, 504 may be formed of one or more of hook-up wire, twisted pair wire, ribbon cable, coaxial cable, and traces on a flexible circuit board. Electrical conductors 502, 504 may be shielded to reduce electromagnetic interference picked-up by electrical conductors 502, 504. Electrical conductors 502, 504 may be braided metal sleeves that extend and compress lengthwise more than conventional wires.

FIG. 6 is a functional diagram showing one example coupling mechanism for physically coupling resistance-band exercise monitoring device 100 of FIGS. 1-5 to right resistance band 132. For clarity, FIG. 6 shows physical coupling of only right force sensor 130; left force sensor 140 may similarly couple with left resistance band 142. Right force sensor 130 mechanically couples with a first connector 610 that releasably couples with a second connector 612 mechanically coupled to one end (opposite the handle) of right resistance band 132. In the embodiment shown in FIG. 6, first and second connectors 610 and 612 are mating female and male side-release buckles. However, connectors 610 and 612 may be of other types without departing from the scope hereof. Where connectors 610 and 612 have genders for mating, these genders may be reversed without departing from the scope hereof. In certain embodiments, the mechanical coupling between right force sensor 130 and first connector 610 includes an adapter strap 614.

Connectors 610 and 612 allow resistance-band exercise monitoring device 100 to interchangeably couple with resistance bands 132 and 142, as well as facilitating the exchange of resistance bands 132 and 142 with others to perform different exercises and/or accommodate users of different heights and/or sizes. For example, connectors 610 and 612 allow resistance bands 132, 142 to be replaced with resistance bands having a different resistance, allowing user 101 to perform other exercises and/or use different exertion forces (e.g., how "hard" the exercise is to perform).

FIG. 7 is a functional diagram showing resistance-band exercise monitoring device 100 of FIGS. 1-5 configured with an extension strap 716. Extension strap 716 may be used to extend the length of the flexible strap 160, as needed for certain exercises, for example. Extension strap 716 has two connectors 720 and 722 that are similar to, and couple with, connectors 612 and 610. Extension strap 716 and adapter strap 614 may be constructed of similar material as flexible strap 160, or another type of non-stretching flexible material. In some embodiments, extension strap 716 includes a cam buckle (not shown) either separate from, or integrated into, one or both of connectors 720 and 722, allowing length 718 of extension strap 716 to be adjusted without having to engage and disengage connectors 720, 722. In another embodiment, adapter strap 614 includes a cam buckle (not shown) either separate from, or integrated into, first connector 610, allowing a length of adapter strap 614 to be adjusted without having to engage and disengage connector 610. For clarity of illustration, FIG. 7 only shows physical coupling of extension strap 716 to right force sensor 130; left force sensor 140 may similarly couple to a second extension strap equivalent to extension strap 716.

Figure 8:
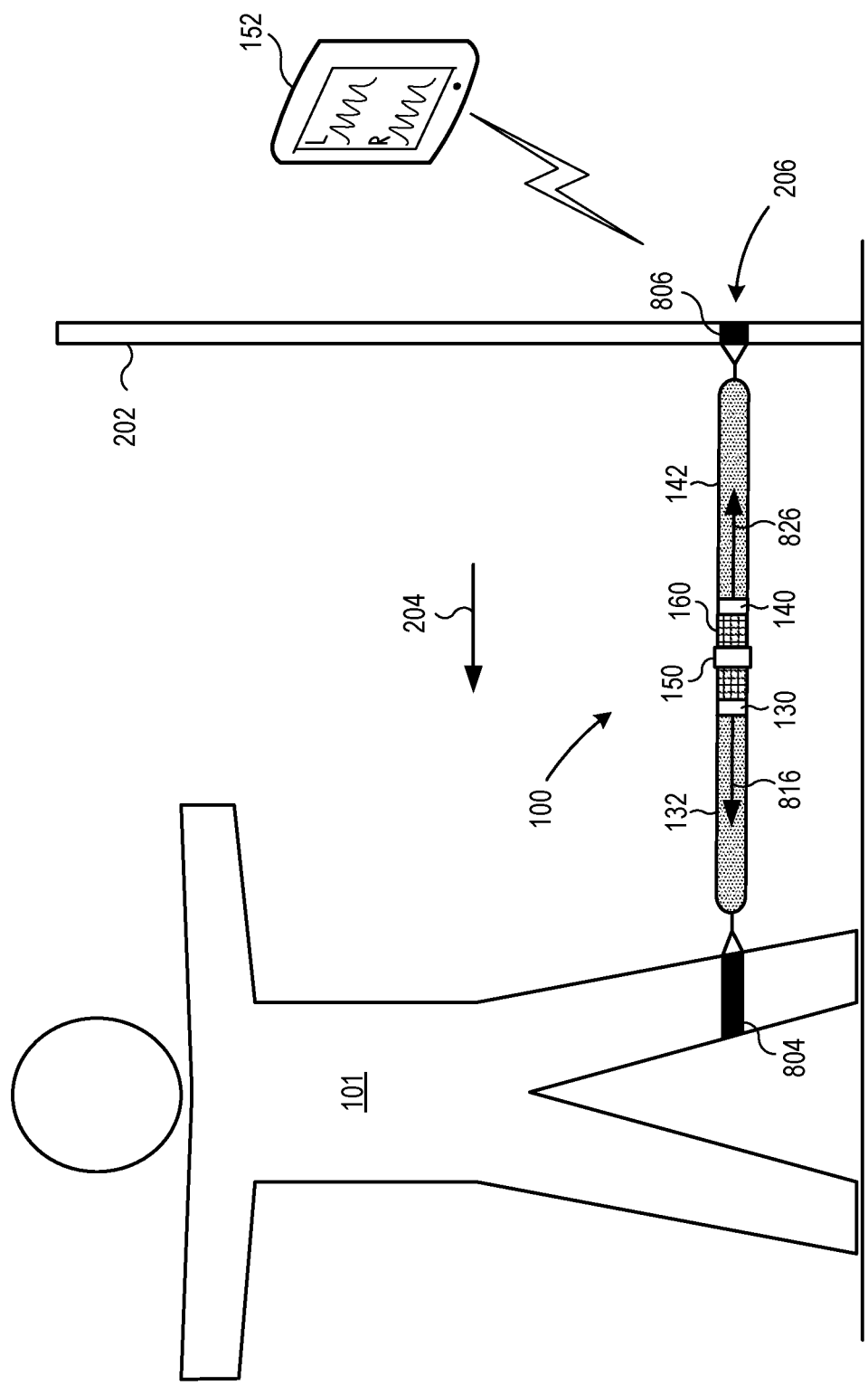
FIG. 8 shows the resistance-band exercise monitoring device of FIGS. 1-5 being used to monitor a third resistance-band exercise, in embodiments.

FIG. 8 shows resistance-band exercise monitoring device 100 of FIGS. 1-5 being used to monitor a third resistance-band exercise. For this exercise, flexible strap 160 is not anchored. One end of right resistance band 132 physically couples to a leg strap 804 that attaches to a leg of user 101. Left resistance band 142 connects to vertical support 202 using a support strap 806, for example. Resistance bands 132 and 142 are physically coupled together in series by resistance-band exercise monitoring device 100.

User 101 may apply a force in horizontal direction 204, imparting a right tension 816 in right resistance band 132 and a corresponding left tension 826 in left resistance band 142. In this configuration, force sensors 130 and 140 sense similar forces since right tension 816 and left tension 826 are equal, even when resistance bands 132 and 142 have different resistances. Accordingly, when determining the effort exerted by user 101, a signal from one of force sensors 130, 140 may be ignored, or the data from both force sensors 130 and 140 may be averaged to reduce noise and/or measurement error.

Resistance-band exercise monitoring device 100 may be used with only one of resistance bands 132, 142, such as when left resistance band 142 is omitted and support strap 806 connects to left force sensor 140, or when resistance band 132 is omitted and leg strap 804 connects directly to right force sensor 130. In either configuration, force sensors 130 and 140 each sense the same force since right tension 816 and left tension 826 are equal.

FIG. 9 is a schematic diagram showing example components and functionality of electronics module 150 of FIGS. 1-5 and 8. Electronics module 150 includes left sensor conditioning electronics 940 that receive and condition a left sensor signal 938 from left force sensor 140 to generate a left conditioned signal 942. Electronics module 150 includes right sensor conditioning electronics 930 that receive and condition a right sensor signal 928 from right force sensor 130 to generate a right conditioned signal 932. Electronics module 150 also includes a microprocessor circuit 902 that receives and processes conditioned signals 932, 942, and a RF transceiver circuit 906 electrically coupled to an antenna 916 for wirelessly communicating with remote device 152.

RF transceiver circuit 906 may use one or more wireless protocols, such as Bluetooth, Wi-Fi, or ZigBee. In certain embodiments, RF transceiver circuit 906 transmits wireless communication 151 to remote device 152 using any of several protocols for streaming data over networks, such as User Datagram Protocol (UDP), Transmission Control Protocol (TCP), Hypertext Transfer Protocol (HTTP), Real-Time Streaming Protocol (RTSP), and Real-Time Transport Protocol (RTP). RF transceiver circuit 906 may stream data using techniques implementable with these protocols, such as adaptive bitrate streaming and progressive download. In certain embodiments, RF transceiver circuit 906 may also wirelessly receive, from remote device 152 via antenna 916, instructions and/or data to store in memory 1004 (see FIG. 10). For example, the user may interact with an application 1106 (see FIG. 11) running on remote device 152 to define operation of electronics module 150, as described in further detail below.

Conditioning electronics 930 and 940 may each amplify, filter, and/or digitize sensor signals 928 and 938, respectively. Depending upon the type of force sensors 130, 140, conditioning electronics 930, 940 may be configured for two-terminal sensing, four-terminal Kelvin sensing, a Wheatstone bridge, or another type of impedance, voltage, or current measurement technique. Conditioning electronics 930 and 940 may include difference amplifiers, instrumentation amplifiers, and/or similar components for analog signal conditioning. In some embodiments, conditioning electronics 930 and 940 include filters to reject noise from force sensors 130 and 140 and/or interference picked up by electrical conductors 502 and 504. Conditioning electronics 930, 940 may also include analog-to-digital converters (ADCs) to digitize the conditioned signals, wherein conditioned signals 932 and 942 are digital.

In certain embodiments, conditioning electronics 930 and 940 may be omitted where sensor signals 928 and 938 are digital signals outputted by force sensors 130 and 140. In other embodiments, conditioning electronics 930 and 940 may be configured for low-voltage differential signaling (LVDS), serial peripheral interface (SPI), or another type of serial or parallel communication protocol.

Microprocessor circuit 902 may include a digital signal processor (DSP), a field-programmable gate array (FPGA), or another type of integrated circuit capable of performing logic, control, and input/output operations. Microprocessor circuit 902 may include a mixed-signal integrated circuit, such as a system-on-chip (SoC) or microcontroller unit (MCU), that combines a processor, memory, and input/output interfaces on a single chip. In certain embodiments, microprocessor circuit 902 and RF transceiver circuit 906 are implemented as a wireless chipset 920 that combines the functionalities of a microprocessor and wireless transceiver on a single integrated circuit. Wireless chip set 920 may include an SoC or MCU, and may also include one or more ADCs and other on-chip components that perform certain functionality of conditioning electronics 930, 940, thereby simplifying or eliminating conditioning electronics 930 and 940.

Figure 10:
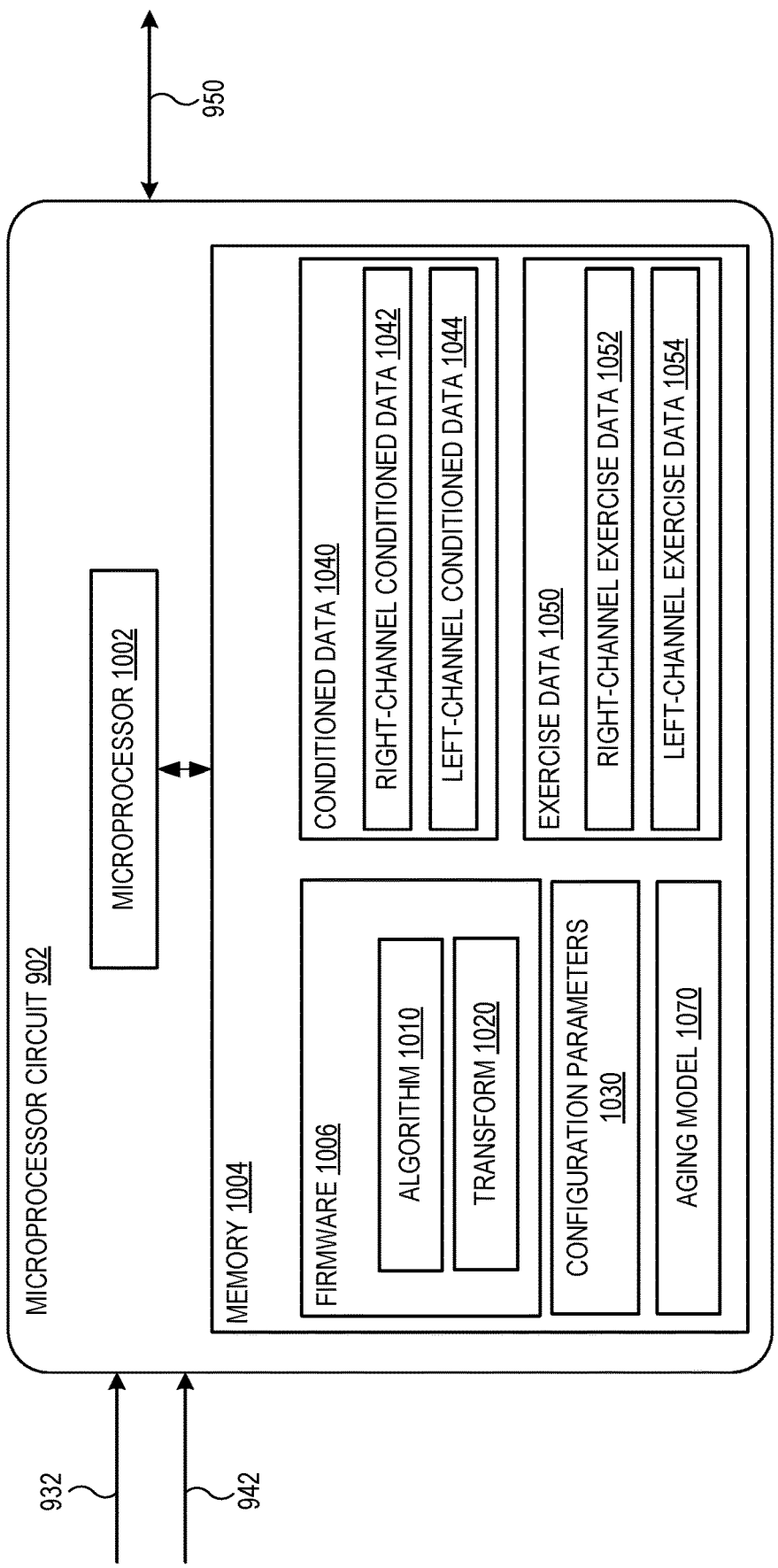
FIG. 10 is a functional diagram showing example detail of the microprocessor circuit of FIG. 9, in embodiments.
Figure 11:
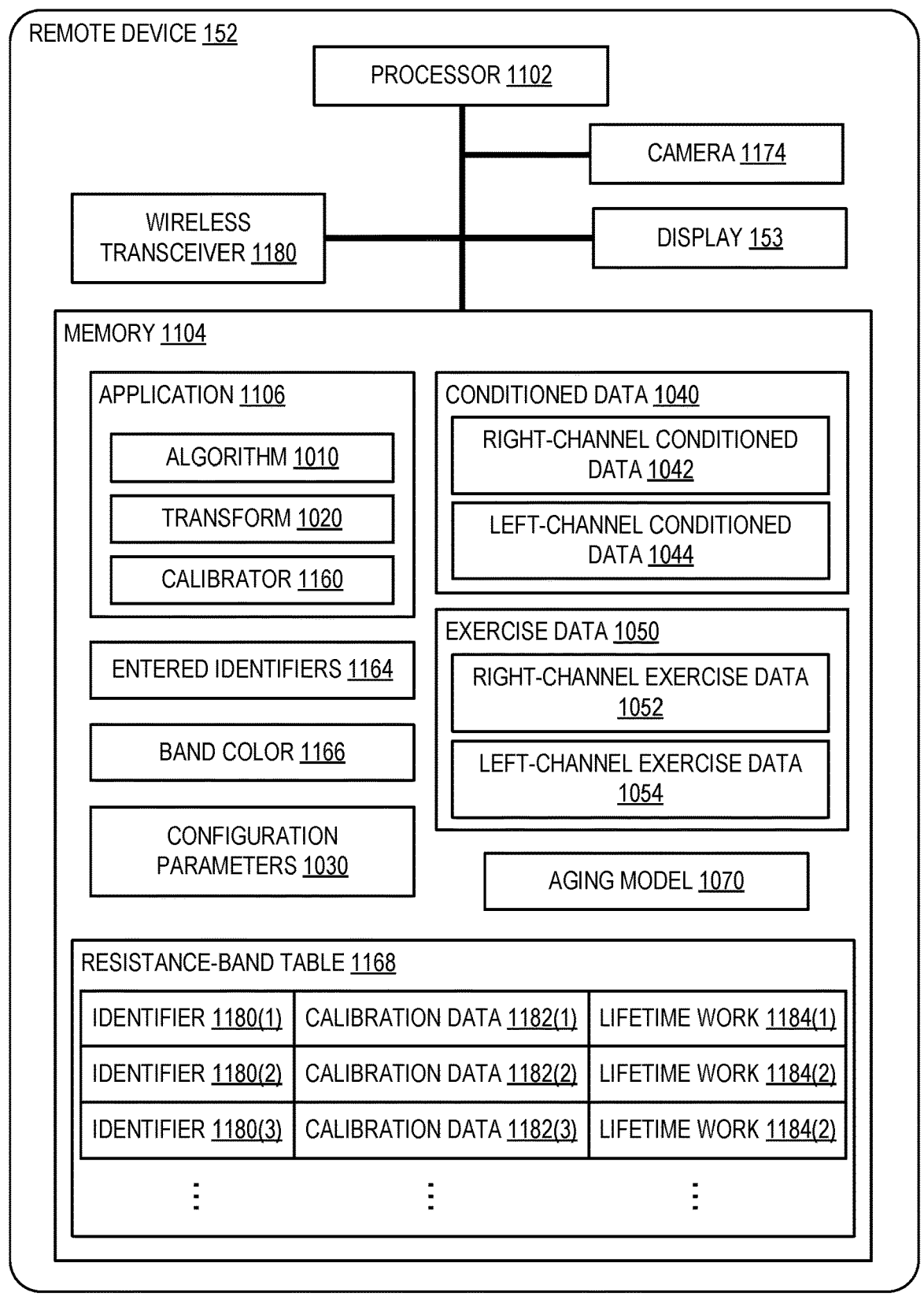
FIG. 11 is a functional diagram showing example detail of the remote device of FIGS. 1, 2, and 8, in embodiments.

FIG. 10 is a functional diagram showing example detail of microprocessor circuit 902 of FIG. 9. FIG. 11 is a functional diagram showing example detail of remote device 152 of FIGS. 1, 2, and 8. FIGS. 10 and 11 are best viewed together with the following description.

Microprocessor circuit 902 includes a microprocessor 1002 communicatively coupled with a memory 1004 storing machine-readable instructions (shown as firmware 1006) and corresponding data. Memory 1004 may include both volatile memory (e.g., RAM, SRAM, etc.) and nonvolatile memory (e.g., ROM, FLASH, etc.). Firmware 1006 includes machine-readable instructions that when executed by microprocessor 1002 control operation of electronics module 150. Firmware 1006 may include at least one algorithm 1010 and at least one mathematical transform 1020. Algorithm 1010 and transform 1020 are selected based upon desired functionality of electronics module 150, as described in further detail below.

Remote device 152 includes a processor 1102 communicatively coupled with a memory 1104 storing machine-readable instructions (shown as application 1106) and corresponding data. Memory 1104 may include both volatile memory (e.g., RAM, SRAM, etc.) and nonvolatile memory (e.g., ROM, FLASH, etc.). Application 1106 includes machine-readable instructions that, when executed by processor 1102, control operation of remote device 152. In certain embodiments, as described below, application 1106 includes one or both of algorithm 1010 and transform 1020. Remote device 152 may also include a wireless transceiver 1180 for wirelessly communicating (e.g., receiving wireless communication 151) with electronics module 150.

Within microprocessor circuit 902, memory 1004 is shown storing configuration parameters 1030, conditioned data 1040, and exercise data 1050. Configuration parameters 1030 may include values that define operation of firmware 1006 (e.g., for configuring one or both of algorithm 1010 and transform 1020). Conditioned data 1040 includes right-channel conditioned data 1042 formed of digitized values of right conditioned signal 932, and left-channel conditioned data 1044 formed of digitized values of left conditioned signal 942. When firmware 1006 (e.g., one or both of algorithm 1010 and transform 1020) is executed, microprocessor 1002 processes right-channel conditioned data 1042 into right-channel exercise data 1052 of exercise data 1050, and left-channel conditioned data 1044 into left-channel exercise data 1054 of exercise data 1050. Microprocessor circuit 902 then sends exercise data 1050 over data bus 950 to RF transceiver circuit 906 for transmission, via antenna 916, to remote device 152 as wireless communication 151.

In certain embodiments, RF transceiver circuit 906 may implement a Bluetooth profile such as Human Interface Device Profile (HID), Hands-Free Profile (HFP), LAN Access Profile (LAP), and a Bluetooth Advanced Audio Distribution Profile (A2DP). For example, RF transceiver circuit 906 may use A2DP for streaming right-channel and left-channel conditioned data 1042, 1044 (or right-channel and left-channel exercise data 1052, 1054) via a single wireless channel, to remote device 152.

Remote device 152 receives exercise data 1050 in wireless communication 151 and may display exercise data 1050 to a user (e.g., user 101) via display 153. In certain embodiments, remote device 152 stores exercise data 1050 for future processing and/or display. In other embodiments, microprocessor circuit 902 sends conditioned data 1040 to remote device 152, wherein remote device 152 receives conditioned data 1040 and processes conditioned data 1040 into exercise data 1050 (e.g., via algorithm 1010 and/or transform 1020).

In certain embodiments, algorithm 1010 implements compression that reduces a size of exercise data 1050 for output by RF transceiver circuit 906. Algorithm 1010 may also implement digital filtering of input data 1040. Algorithm 1010 may also implement encoding of right-channel conditioned data 1042 and left-channel conditioned data 1044 to form exercise data 1050 for wireless transmission by RF transceiver circuit 906 via a single wireless channel.

Where one or both of algorithm 1010 and transform 1020 are not implemented within microprocessor circuit 902, exercise data 1050 may be partially processed and may resemble conditioned data 1040. For example, within microprocessor circuit 902, algorithm 1010 may implement only data compression such that conditioned data 1040 is compressed before transmission to remote device 152. In these embodiments, electronics module 150 and remote device 152 share processing of conditioned data 1040, advantageously reducing the power consumption and computing requirements of microprocessor circuit 902. Accordingly, where one or both of algorithm 1010 and transform 1020 are implemented within application 1106 of remote device 152, algorithm 1010 and transform 1020 may be omitted from microprocessor circuit 902.

Mathematical transform 1020, whether implemented within firmware 1006 or application 1106, may transform conditioned data 1040 such that exercise data 1050 corresponds to one or more physical units (e.g., pounds or newtons for force, Joules or kilocalories for energy). Configuration parameters 1030 may include mathematical parameters and constants used by algorithm 1010 and/or transform 1020. For example, configuration parameters 1030 include mathematical parameters used by transform 1020 to implement a mathematical transformation of conditioned data 1040 into exercise data 1050. The mathematical parameters may be multiplicative constants and/or offsets used by transform 1020 to implement a linear transformation. The offset may be used to correct for electronic offsets introduced by conditioning electronics 930 and 940 that produce erroneous non-zero values when no forces are applied to force sensors 130 and 140. Configuration parameters 1030 may include other mathematical parameters used by transform 1020 to implement a nonlinear transformation that, for example, corrects nonlinear responses of force sensors 130, 140 and/or conditioning electronics 930, 940. Transform 1020 may alternatively implement a wavelet transformation to identify one or more of repetitions, peak forces, and a repetition rate within conditioned data 1040.

In one example of operation, microprocessor circuit 902 executes algorithm 1010 and/or mathematical transform 1020 to calculate work performed on resistance bands 132,

142. For example, microprocessor circuit 902 may (1) convert conditioned data 1040 into units of force, and (2) square each value of force and divide the result by twice a value of the spring constant. Alternatively, microprocessor circuit 902 may (1) convert conditioned data 1040 into units of resistance-band displacement (e.g., meters), and (2) square each value of displacement and multiply the result by one-half of the value of the spring constant. The value of the spring constant may be stored as a parameter within configuration parameters 1030. The value of the spring constant may be selected for consistency with the one or more physical units. For example, when conditioned data 1040 is converted into the unit of newtons, and the spring constant is in the unit of newtons-per-meter, then the calculated value of work will be in the unit of joules.

In certain embodiments, microprocessor circuit 902 executes algorithm 1010 and/or mathematical transform 1020 to calculate power exerted on resistance bands 132, 142. For example, microprocessor circuit 902 may process conditioned data 1040 to (1) calculate a first value of work $W_2$ at a first time $t_1$, (2) calculate a second value of work $W_2$ at a second time $t_2$, and (3) calculate power by dividing a difference of works $W_2-W_1$ by a difference of times $t_2-t_1$. To obtain times $t_1$ and $t_2$, microprocessor circuit 902 may time-stamp conditioned data 1040 to indicate when forces are sensed by force sensors 130 and 140 (e.g., when conditioned signals 942, 932 are digitized and received within microprocessor circuit 902).

As noted above, a user may interact with application 1106 to change configuration parameters 1030. For example, when resistance bands 132, 142 are exchanged for other resistance bands, the user may interact with application 1106 to update configuration parameters 1030 with spring constants and/or other parameters for the other resistance bands. Many resistance bands have a color indicating the spring constant. A resistance band with a low resistance (i.e., easiest to stretch) may be colored yellow, a resistance band with a medium resistance may be colored red, and a resistance band with a heavy resistance (i.e., hardest to stretch) may be colored blue. Accordingly, in certain embodiments, the user enters a resistance-band color 1166 into remote device 152, wherein remote device 152 updates configuration parameters 1030 based on resistance-band color 1166. The user may enter resistance-band color 1166 into remote device 152, for example, by selecting from a drop-down list displayed on display 153. In certain embodiments, the user captures an image of the resistance band with a camera 1174 of remote device 152, and application 1106 detects resistance-band color 1166 within the image and updates configuration parameters 1030 based on detected resistance-band color 1166.

Calibration

In certain embodiments, application 1106 includes a calibrator 1160 that cooperates with remote device 152 to calibrate resistance bands 132, 142, thereby improving the accuracy of sensed forces and/or work calculated by algorithm 1010. More specifically, calibrator 1160, when executed by processor 1102, controls remote device 152 to generate calibration data 1182 for resistance bands 132, 142 connected to resistance-band exercise monitoring device 100. Calibrator 1160 may store calibration data 1182 in a resistance-band table 1168 with corresponding identifiers 1180 that uniquely identify resistance bands associated with calibration data 1182. For example, FIG. 11 shows resistance-band table 1168 storing first calibration data 1182(1) associated with a first resistance band having a first identifier 1180(1), second calibration data 1182(2) associated with a second resistance band having a second identifier 1180(2), and third calibration data 1182(3) associated with a third resistance band having a third identifier 1180(3). Although shown in FIG. 11 storing calibration data 1182 for three resistance bands, resistance-band table 1168 may store calibration data 1182 for a different number of resistance bands without departing from the scope hereof.

When a user changes resistance bands 132, 142 with two other resistance bands, the user may interact with remote device 152 to enter identifiers 1164 for the two other resistance bands, wherein application 1106 searches identifiers 1180 stored in resistance-band table 1168 for the entered identifiers 1164. When entered identifiers 1164 are found in resistance-band table 1168, application 1106 may then use the corresponding calibration data 1182 as configuration parameters 1030 so that algorithm 1010 and/or transform 1020 are properly configured based on the two other resistance bands. When entered identifiers 1164 are not found in resistance-band table 1168, application 1106 may present an error to the user, and/or prompt the user to calibrate the two other resistance bands and store the corresponding calibration data 1182 as new entries in resistance-band table 1168.

In one example of calibration, calibrator 1160 controls remote device 152 to instruct the user to hang known weights (e.g., 5 pounds) from one end of each of resistance bands 132 and 142. In another example, calibrator 1160 controls remote device 152 to instruct the user to hang one weight on each of resistance bands 132, 142, and then queries the user to enter a value of each weight. When the user indicates to remote device 152 that the weights are hung from resistance bands 132 and 142, calibrator 1160 then communicates with electronics module 150 to receive conditioned data 1040 (e.g., values of conditioned signals 932, 942) for resistance bands 132 and 142. Calibrator 1160 then calculates calibration data 1182 for resistance bands 132 and 142 based upon the known weights and received conditioned data 1040. For example, calibrator 1160 may divide values of conditioned data 1040 by the known weights to compute a conversion factor for each of resistance bands 132 and 142 that converts conditioned data 1040 into exercise data 1050 corresponding to a physical unit (e.g., force). Calibrator 1160 may then store these conversion factors in resistance-band table 1168 as calibration data 1182 associated with corresponding identifiers 1180 of resistance bands 132 and 142.

In certain embodiments, calibrator 1160 determines a spring constant for a resistance band based upon a displacement of the resistance band. The spring constant may be stored in resistance-band table 1168 as calibration data 1182 associated with the resistance band. For example, calibrator 1160 may instruct the user to move right handle 110 to a first position $x_1$ by applying a right force 112 to right resistance band 132, which is received by calibrator 1160 as a first force Fi. Calibrator 1160 may then instruct the user to move right handle 110 to a second position $x_2$ by increasing right force 112, which is received by calibrator 1160 as a second force $F_2$. Calibrator 1160 then calculates a spring constant of right resistance band 132 by dividing a difference of first and second forces $F_2-F_1$ by a difference between first and second positions $x_2-x_1$. In certain embodiments, calibrator 1160 may receive distances $x_2$ and $x_1$, or the difference thereof, from the user. Calibrator 1160 may use a similar procedure to calibrate left resistance band 142 to determine the spring constant for left resistance band 142.

Resistance-band table 1168 advantageously allows several calibrated resistance bands to be used with one resistance-band exercise monitoring device 100. Thus, resistance-band table 1168 allows several users to use one resistance-band exercise monitoring device 100, wherein each of the users attaches a different pair of resistance bands 132, 142 to the one resistance-band exercise monitoring device 100.

Identifier 1164 may be any piece of identifying information that uniquely identifies a resistance band whose calibration data is stored in resistance-band table 1168. Examples of identifier 1164 include an identification number, name, or nickname. In one embodiment, a user interacts with a drop-down list displayed on display 153 to select a previously-calibrated resistance band whose calibration data is already stored in resistance-band table 1168. The drop-down list may include a selectable option to add a new resistance band to resistance-band table 1168. In one embodiment, application 1106 controls remote device 152 to use camera 1174 to scan a bar code (or other such machine-readable identification) of a resistance band to obtain identifier 1164.

Calibrations may be performed periodically, or as needed, to adjust for aging of, or other changes to, resistance bands 132, 142. Aging and other changes may include variations of spring constants due to use of the bands, aging of resistance-band materials, aging of force sensors 130, 140, changes in temperature and humidity, and other factors known to affect the spring constant of a resistance band and/or performance of force sensors 130, 140.

In certain embodiments, calibrator 1160 utilizes an aging model 1070 that automatically adjusts calibration data 1182 as resistance bands 132, 142 wear and/or age. Calibrator 1160 may generate aging model 1070 based upon periodic calibrations and/or predefined aging data. In certain embodiments, calibrator 1160 periodically (e.g., monthly) requests the user calibrate resistance bands 132 and 142 to update corresponding calibration data 1182 and thereby determine changes in calibration data 1182 over time. Calibrator 1160 may then use aging model 1070 to update calibration data 1182 (e.g., spring constant values, scale factors, etc.) based upon the age and/or integrated lifetime use of resistance bands 132, 142. When calibrator 1160 determines from calibration data 1182 and/or aging model 1070 that resistance bands 132, 142 are approaching the end of their useful life, calibrator 1160 may control remote device 152 to indicate to the user that resistance bands 132, 142 should be replaced. While the above discussion shows aging model 1070 as being stored and used on remote device 152, aging model 1070 may be alternatively stored and used in electronics module 150 to achieve the same functionality.

In certain embodiments, calibrator 1160 may record in resistance-band table 1168 cumulative lifetime work 1184 performed by each resistance band over its lifetime. Cumulative lifetime work 1184 may thus be used to track wear of a resistance band according to aging model 1070. For example, for each resistance band 132, 142, calibrator 1160 may integrate exercise data 1050 to determine work performed by each resistance band 132, 142, and update the corresponding lifetime work 1184 accordingly. Prior to exercise, calibrator 1160 may update calibration data 1182 according to aging model 1070 based upon entered identifiers 1164 that identify which resistance bands 132, 142, will be used by the user for the exercise.

Where hyperelastic materials such as rubber and latex are used for resistance bands 132, 142, such resistance bands 132, 142 may not obey Hooke's Law, whereby applied force is proportional to the distance extended or compressed. Accordingly, transform 1020 may be defined to correct for this nonlinear relationship using a plurality of parameters (e.g., numerical values/constants) defined within configuration parameters 1030. In certain embodiments, transform 1020 may implement the nonlinear transformation as a piece-wise function of force versus input data 1040.

Application 1106 may display exercise data 1050 as a graph or chart on display 153 of remote device 152. For example, application 1106 may generate the graph to show exercise data 1050 and time on a rolling chart that updates periodically as user 101 exercises. Application 1106 may display exercise data 1050 determined from only one of, or both of, force sensors 130 and 140. Application 1106 may also display exercise data 1050 in numeric format on display 153.

As shown in FIG. 9, electronics module 150 includes a battery 904 to power the components of electronics module 150. Battery 904 may also power force sensors 130 and 140, when needed by the type of force sensors 130 and 140. In certain embodiments, electronics module 150 includes an external power connector 914 for recharging battery 904 from an external power source (e.g., a wall adaptor or a USB power source—not shown). Electronics module 150 may include a charging regulator circuit 918 for conditioning externally provided power to a voltage and current suitable for charging battery 904.

Microprocessor circuit 902 may include power diagnostics and monitoring functionality for battery 904 and/or charging regulator circuit 918, whereby microprocessor circuit 902 may wirelessly transmit, via RF transceiver circuit 906, status updates to application 1106 for display by remote device 152 to user 101 (e.g., via display 153). Updates may include, for example, one or more of an estimate of charge lifetime remaining in battery 904, a warning that battery 904 has limited charge lifetime remaining and needs to be recharged, and a notification to recharge battery 904. In other embodiments, battery 904 is a single-use device, wherein user 101 replaces battery 904 when it is exhausted.

Figure 12:
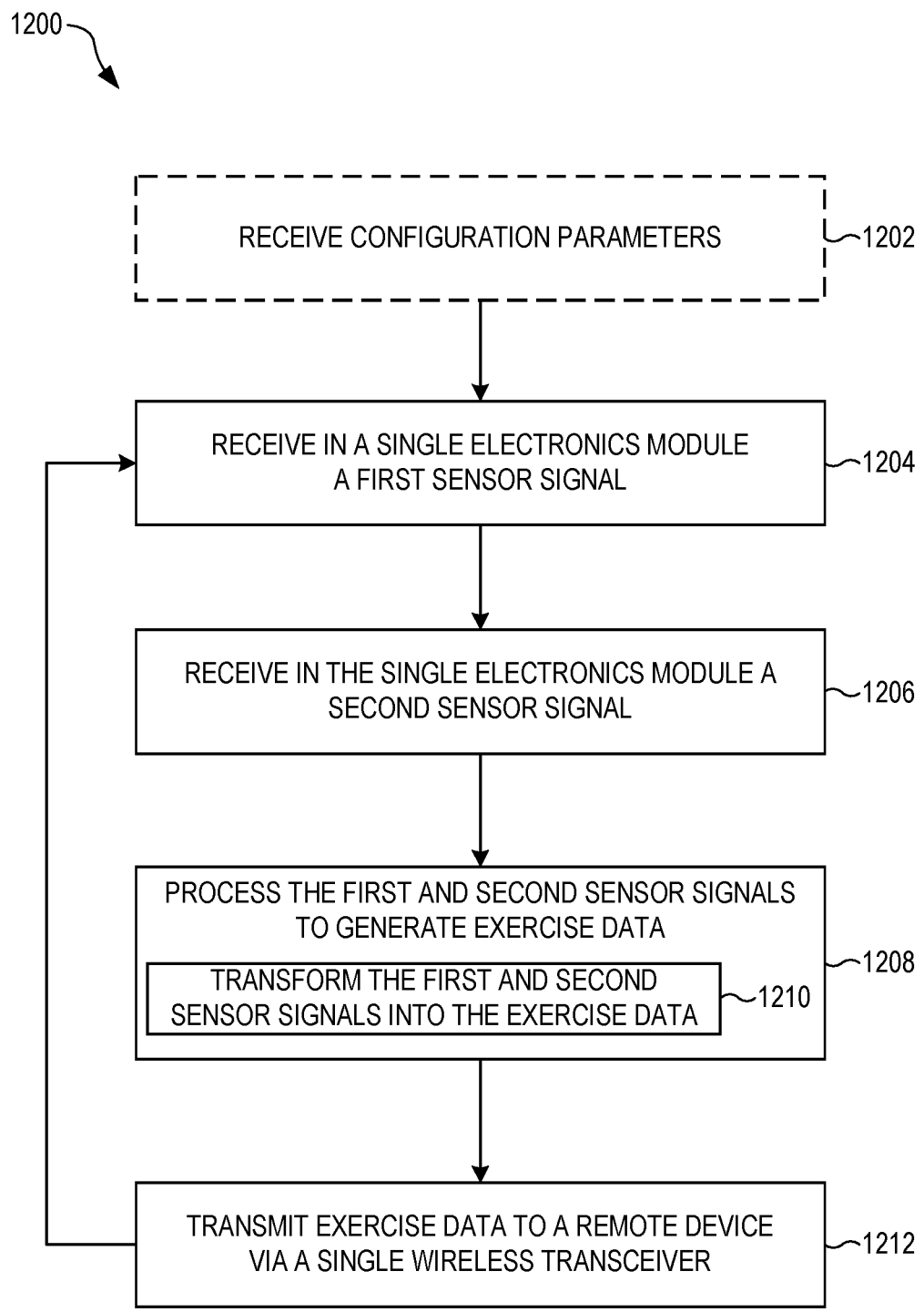
FIG. 12 is a flowchart showing one example method that electronically measures resistance-band exercise, in embodiments.

FIG. 12 is a flowchart showing one example method 1200 that electronically measures resistance-band exercise. Method 1200 may be implemented with electronics module 150 of FIGS. 1-5 and 9. In a step 1204 of method 1200, the single electronics module receives, via a first set of conductor pathways of a flexible strap, a first sensor signal from a first force sensor mechanically coupled with a first resistance band physically coupled with a first end of the flexible strap. In one example of step 1204, left conditioning electronics 940 of electronics module 150 receives left sensor signal 938 from left force sensor 140 via conductor pathways 504 of flexible strap 160.

In a step 1206 of method 1200, the single electronics module receives, via a second set of conductor pathways of the flexible strap, a second sensor signal from a second force sensor mechanically coupled with a second resistance band physically coupled with a second end, opposite the first end, of the flexible strap. In one example of step 1204, right conditioning electronics 930 of electronics module 150 receives right sensor signal 928 from right force sensor 130 via conductor pathways 502 of flexible strap 160.

In a step 1208 of method 1200, the single electronics module processes the first and second sensor signals to generate exercise data indicative of the resistance-band exercise performed with the first and second resistance bands. In one example of step 1208, electronics module 150 conditions left and right sensor signals 938, 928 into respective left and right conditioned signals 942, 932. Microprocessor circuit 902 then processes left and right conditioned signals 942, 932 to generate and store conditioned data 1040 in memory 1004. Microprocessor circuit 902 may also generate exercise data 1050 from conditioned data 1040.

In certain embodiments, step 1208 includes a sub-step 1210 in which the first and second sensor signals are transformed into the exercise data according to a mathematical transformation so that the exercise data corresponds to one or more physical units. In one example of step 1210, microprocessor circuit 902 executes transform 1020 to transform conditioned data 1040 into exercise data 1050 such that exercise data 1050 corresponds to one or more physical units (e.g., force in newtons, work in kilocalories, power in watts).

In a step 1212 of method 1200, a single wireless transceiver, of the single electronics module, transmits the exercise data to a remote device. In one example of step 1212, electronics module 150 transmits exercise data 1050 to remote device 152 via RF transceiver circuit 906 and antenna 916. In embodiments that do not include step 1210, electronics module 150 transmits conditioned data 1040 (as opposed to exercise data 1050) to remote device 152 via RF transceiver circuit 906 and antenna 916.

In certain embodiments, steps 1204 through 1212 periodically repeat to determine and send exercise data to the remote device. For example, steps 1204 through 1212 may repeat while a user is exercising with resistance-band exercise device 100 so that electronics module 150 captures and transmits exercise data 1050 corresponding to the user's exercising. In certain embodiments, steps 1204, 1206, 1208, and 1212 operate continuously and simultaneously so that electronics module 150 streams exercise data 1050 to remote device 152 as the user exercises.

In certain embodiments, method 1200 includes a step 1202 in which configuration parameters that configure the mathematical transformation of step 1210 are received from the remote device. The configuration parameters may include a spring constant for one or both of the first and second resistance bands. In one example of step 1202, electronics module 150 wirelessly receives, from remote device 152, configuration parameters 1030 that includes a spring constant for one or both of first and second resistance bands 132, 142. The spring constant (and/or other configuration parameters 1030) may be used to configure algorithm 1010 and/or transform 1020.

Figure 13:
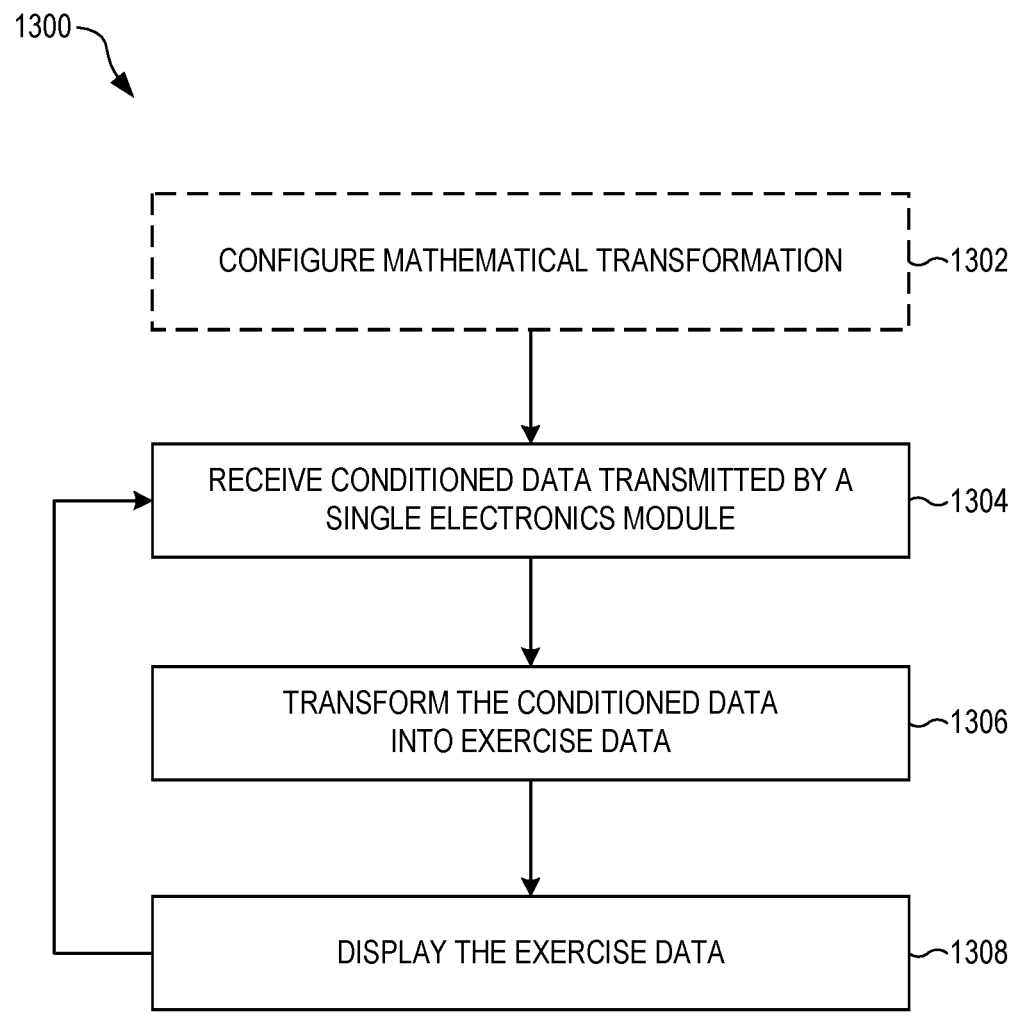
FIG. 13 is a flowchart showing one example method that remotely receives and processes resistance-band exercise data, in embodiments.

FIG. 13 is a flowchart showing one example method 1300 that remotely receives and processes resistance-band exercise data. Method 1300 may be implemented by remote device 152 of FIGS. 1, 2, 8, and 11. In a step 1304 of method 1300, conditioned data is received from a single wireless transceiver of a single electronics module of a resistance-band exercise monitoring device. The conditioned data is received via a single wireless channel and indicates first and second forces applied to respective first and second resistance bands. In one example of step 1304, remote device 152 receives, via wireless transceiver 1180, left-channel conditioned data 1044 and right-channel conditioned data 1042 wirelessly transmitted by electronics module 150.

In a step 1306 of method 1300, the conditioned data is transformed into exercise data using a mathematical transformation. In one example of step 1306, application 1106 runs on remote device 152 to execute transform 1020 to convert conditioned data 1040 into exercise data 1050.

In a step 1308 of method 1300, the exercise data is displayed. In one example of step 1308, remote device 152 displays exercise data 1050 on display 153.

Steps 1304 through 1308 may periodically repeat to update the display as conditioned data 1040 is received from electronics module 150. For example, steps 1304 through 1308 may repeat continuously as a user exercises with resistance-band exercise device 100, and as remote device 152 receives exercise data 1050 from electronics module 150. In one embodiment, steps 1304, 1306, and 1308 operate continuously and simultaneously so that remote device 152 receives streaming exercise data 1050 from electronics module 150, and displays exercise data 1050 as the user exercises.

In certain embodiments, method 1300 includes a step 1302 in which the mathematical transformation is configured according to configuration parameters. For example, the mathematical transformation may be configured so that the exercise data corresponds to one or more physical units. In one example of step 1302, calibration data 1182 is retrieved from resistance-band table 1168 and stored as configuration parameters 1030. In another example of step 1302, remote device 152 selects configuration parameters 1030 according to a resistance-band color 1166 entered by the user into remote device 152. In another example of step 1302, remote device 152 captures an image of one or both of resistance bands 132, 142 and selects configuration parameters 1030 based upon a color of resistance bands 132, 142 determined from the image.

In embodiments where transform 1020 is implemented by electronics module 150, exercise data 1050 (as opposed to conditioned data 1040) is received from electronics module 150 in step 1304, and step 1306 is omitted. In certain embodiments, exercise data 1050 is stored in memory 1104 in method 1300 (e.g., in addition to, or instead of, displaying exercise data 1050 in step 1308) so that stored exercise data 1050 may be later recalled, processed, and/or viewed, by the user. In these embodiments, exercise data 1050 may be stored continuously and simultaneously according to steps 1304, 1306, and 1308 so that remote device 152 stores exercise data 1050 generated and streamed by electronics module 150 as the user exercises.

Changes may be made in the above methods and systems without departing from the scope hereof. It should thus be noted that the matter contained in the above description or shown in the accompanying drawings should be interpreted as illustrative and not in a limiting sense. The following claims are intended to cover all generic and specific features described herein, as well as all statements of the scope of the present method and system, which, as a matter of language, might be said to fall therebetween.

What is claimed is:

1. A resistance-band exercise monitoring device, comprising:
- a first force sensor mechanically coupled with a first resistance band to sense a first force applied to the first resistance band;
- a second force sensor mechanically coupled with a second resistance band to sense a second force applied to the second resistance band;
- a single electronics module having a single wireless transceiver; and
- a flexible strap physically coupling with the first and second resistance bands at opposite ends of the flexible strap, and having conductive pathways that electrically couple each of the first and second force sensors with the single electronics module;
- wherein the single electronics module is configured to wirelessly communicate exercise data indicative of the first and second forces to a remote device via the single wireless transceiver.

2. The resistance-band exercise monitoring device of claim 1, wherein:

the first force sensor is configured to communicate a first sensor signal of the sensed first force via a first set of the conductive pathways to the single electronics module; and the second force sensor is configured to communicate a second sensor signal of the sensed second force via a second set of the conductive pathways to the single electronics module.

3. The resistance-band exercise monitoring device of claim 2, the single electronics module further comprising:
a processor;
a memory communicatively coupled with the processor; and
firmware, implemented as machine-readable instructions stored in the memory, that, when executed by the processor, control the single electronics module to:
condition the first and second sensor signals into conditioned data, and
transmit the conditioned data as the exercise data to the remote device via the single wireless transceiver.

4. The resistance-band exercise monitoring device of claim 3, the firmware including additional machine-readable instructions stored in the memory that, when executed by the processor, further control the single electronics module to transform the conditioned data into the exercise data according to a mathematical transformation so that the exercise data corresponds to one or more physical units.

5. The resistance-band exercise monitoring device of claim 4, the firmware including additional machine-readable instructions stored in the memory that, when executed by the processor, further control the single electronics module to receive, from the remote device, configuration parameters that configure the mathematical transformation, the configuration parameters including a spring constant of one or both of the first and second resistance bands.

6. The resistance-band exercise monitoring device of claim 5, the firmware including additional machine-readable instructions stored in the memory that, when executed by the processor, further control the resistance-band exercise monitoring device to cooperate with the remote device to calibrate one or both of the first and second resistance bands to determine the configuration parameters.

7. The resistance-band exercise monitoring device of claim 5, the firmware including additional machine-readable instructions stored in the memory that, when executed by the processor, further control the single electronics module to update the configuration parameters according to an aging model of the first and second resistance bands so that the exercise data corresponds to the one or more physical units after one or both of the first and second resistance bands has aged.

8. The resistance-band exercise monitoring device of claim 1, the flexible strap being deformable by the first and second forces to align a measurement axis of the first force sensor with a direction of the first force and to align a measurement axis of the second force sensor with a direction of the second force.

9. The resistance-band exercise monitoring device of claim 1, the flexible strap further including an adjustment mechanism for changing a length of the flexible strap between the opposite ends of the flexible strap.

10. A method that electronically measures resistance-band exercise, comprising:
receiving, in a single electronics module via a first set of conductor pathways of a flexible strap, a first sensor signal from a first force sensor mechanically coupled with a first resistance band physically coupled with a first end of the flexible strap;
receiving, in the single electronics module via a second set of conductor pathways of the flexible strap, a second sensor signal from a second force sensor mechanically coupled with a second resistance band physically coupled with a second end, opposite the first end, of the flexible strap;
processing the first and second sensor signals within the single electronics module to generate exercise data indicative of the resistance-band exercise performed with the first and second resistance bands; and
transmitting the exercise data to a remote device via a single wireless transceiver of the single electronics module.

11. The method of claim 10, wherein processing includes transforming the first and second sensor signals into the exercise data according to a mathematical transformation so that the exercise data corresponds to one or more physical units.

12. The method of claim 11, further comprising receiving, from the remote device, configuration parameters that configure the mathematical transformation, the configuration parameters including a spring constant for one or both of the first and second resistance bands.

13. The method of claim 12, further comprising calibrating one or both of the first and second resistance bands to determine the configuration parameters so that the exercise data corresponds to the one or more physical units.

14. The method of claim 12, further comprising updating the configuration parameters according to an aging model of the first and second resistance bands so that the exercise data corresponds to the one or more physical units after one or both of the first and second resistance bands has aged.

15. The method of claim 14, further comprising generating the aging model by calibrating the first and second resistance bands over time.

* * * * *